United States Patent
Wu et al.

(10) Patent No.: US 10,654,020 B2
(45) Date of Patent: May 19, 2020

(54) PREPARATION METHOD OF CARBON-COATED CERIA HOLLOW SPHERE

(71) Applicant: DONGGUAN UNIVERSITY OF TECHNOLOGY, Dongguan, Guangdong (CN)

(72) Inventors: Wenjian Wu, Guangdong (CN); Meili Zhang, Guangdong (CN); Lirong Cai, Guangdong (CN); Yongfu Qiu, Guangdong (CN); Hongbo Fan, Guangdong (CN)

(73) Assignee: DONGGUAN UNIVERSITY OF TECHNOLOGY, Dongguan, Guangdong (CN)

( * ) Notice: Subject to any disclaimer, the term of this patent is extended or adjusted under 35 U.S.C. 154(b) by 0 days.

(21) Appl. No.: 16/308,129

(22) PCT Filed: Apr. 4, 2018

(86) PCT No.: PCT/CN2018/081841
§ 371 (c)(1),
(2) Date: Dec. 7, 2018

(87) PCT Pub. No.: WO2019/104927
PCT Pub. Date: Jun. 6, 2019

(65) Prior Publication Data
US 2020/0016565 A1    Jan. 16, 2020

(30) Foreign Application Priority Data
Nov. 28, 2017 (CN) .......................... 2017 1 1217656

(51) Int. Cl.
*B01J 13/22* (2006.01)
*C23C 18/12* (2006.01)
(Continued)

(52) U.S. Cl.
CPC .............. *B01J 13/22* (2013.01); *B01J 13/06* (2013.01); *C23C 18/1204* (2013.01);
(Continued)

(58) Field of Classification Search
None
See application file for complete search history.

(56) References Cited

U.S. PATENT DOCUMENTS 8,603,934 B2 * 12/2013 Chang ...................... B01J 21/18
423/446
10,384,194 B2 * 8/2019 Ouf ........................ B01J 21/063
(Continued)

FOREIGN PATENT DOCUMENTS

CN    103204534 A    7/2013
CN    103408975 A    11/2013
(Continued)

*Primary Examiner* — Allan W. Olsen
(74) *Attorney, Agent, or Firm* — Hamre, Schumann, Mueller & Larson, P.C.

(57) ABSTRACT

The present disclosure discloses a method of preparing a carbon-coated ceria hollow sphere, which includes the following steps of: S110, dispersing silica in a solvent to obtain a silica dispersion; S120, performing a hydrothermal reaction between the silica dispersion and a cerium salt to obtain a ceria-coated silica microsphere; S140, coating the ceria-coated silica microsphere with a carbon source to obtain a primary product, wherein the carbon source is dopamine; S160, sintering the primary product under a protective gas atmosphere to obtain a carbon-coated ceria microsphere; and S170, etching the carbon-coated ceria microsphere by using an etchant to obtain a carbon-coated ceria hollow sphere.

16 Claims, 3 Drawing Sheets

(51) Int. Cl.
  *H01G 11/32* (2013.01)
  *H01G 11/24* (2013.01)
  *B01J 13/06* (2006.01)
(52) U.S. Cl.
  CPC ...... *C23C 18/1241* (2013.01); *C23C 18/1291* (2013.01); *C23C 18/1295* (2013.01); *H01G 11/24* (2013.01); *H01G 11/32* (2013.01)

(56) References Cited

U.S. PATENT DOCUMENTS

| | | | | |
|---|---|---|---|---|
| 2006/0211802 | A1* | 9/2006 | Asgari | A61L 27/04 |
| | | | | 524/439 |
| 2009/0170693 | A1* | 7/2009 | Ikeda | B01J 23/63 |
| | | | | 502/158 |
| 2010/0129713 | A1* | 5/2010 | Yazami | H01M 4/136 |
| | | | | 429/217 |
| 2018/0161762 | A1* | 6/2018 | Ouf | B01J 21/063 |
| 2018/0162801 | A1* | 6/2018 | Kadi | C07C 209/36 |
| 2018/0305294 | A1* | 10/2018 | Kadi | B01J 27/1856 |
| 2019/0097222 | A1* | 3/2019 | Feaver | H01M 4/366 |
| 2020/0016534 | A1* | 1/2020 | Ding | B01J 37/035 |

FOREIGN PATENT DOCUMENTS

| | | |
|---|---|---|
| CN | 103754921 A | 4/2014 |
| CN | 106076347 A | 11/2016 |

* cited by examiner

PREPARATION METHOD OF CARBON-COATED CERIA HOLLOW SPHERE

TECHNICAL FIELD

The disclosure relates to the technical field of new material preparation, and more particularly relates to a preparation method for a carbon-coated ceria hollow sphere.

BACKGROUND

As a rare earth metal oxide, ceria has a unique redox chemical property. Due to the presence of cerium in two oxidation states ($Ce^{3+}$ and $Ce^{4+}$), ceria has a very wide range of applications in the fields of catalysts, secondary batteries (e.g., lithium ion batteries, lithium sulfur batteries, etc.), and supercapacitors.

The performance of ceria, whether regarded as a catalytic material or an electrode material, depends critically on its BET (Brunauer, Emmett, and Teller) surface area. Increasing the BET surface area of ceria can greatly improve its performance in catalysis and its performance as an energy storage electrode material. Therefore, it is a very effective method to increase the BET surface area by nanocrystallization of ceria or by making ceria into a hollow structure, and so on. However, when ceria is used as the electrode material, in the case of charge and discharge of the electrode, the ceria has a volume expansion due to a change in valence state of cerium ions, such that the electrode is easily collapsed, resulting in a sharp decrease in performance.

In the application process, the performance of ceria cannot make a better achievement due to its poor conductivity. For example, when ceria is used as the electrode material of the supercapacitor, its specific capacity, rate performance, and cycle stability are low due to its low conductivity. Therefore, in order to improve the performance and application of ceria, it is still necessary to design a novel structure to overcome the drawbacks existing in the current application process.

SUMMARY

Accordingly, it is necessary to provide a method of preparing a carbon-coated ceria hollow sphere to address the problem that the ceria material is prone to collapse because of volume expansion and has poor conductivity.

A method of preparing a carbon-coated ceria hollow sphere includes the following steps of:
  dispersing silica in a solvent to obtain a silica dispersion;
  performing a hydrothermal reaction between the silica dispersion and a cerium salt to obtain a ceria-coated silica microsphere;
  coating the ceria-coated silica microsphere with a carbon source to obtain a primary product, and the carbon source is dopamine;
  sintering the primary product under a protective gas atmosphere to obtain a carbon-coated ceria microsphere; and
  etching the carbon-coated ceria microsphere by using an etchant to obtain a carbon-coated ceria hollow sphere.

The details of one or more embodiments of the invention are set forth in the accompanying drawings and the description below. Other features, objects, and advantages of the invention will be apparent from the description and drawings, and from the claims.

DETAILED DESCRIPTION OF THE EMBODIMENTS

The carbon-coated ceria hollow sphere and the preparation method thereof will be further described in detail hereinafter with reference to the specific embodiments and the accompanying drawings.

Figure 1:
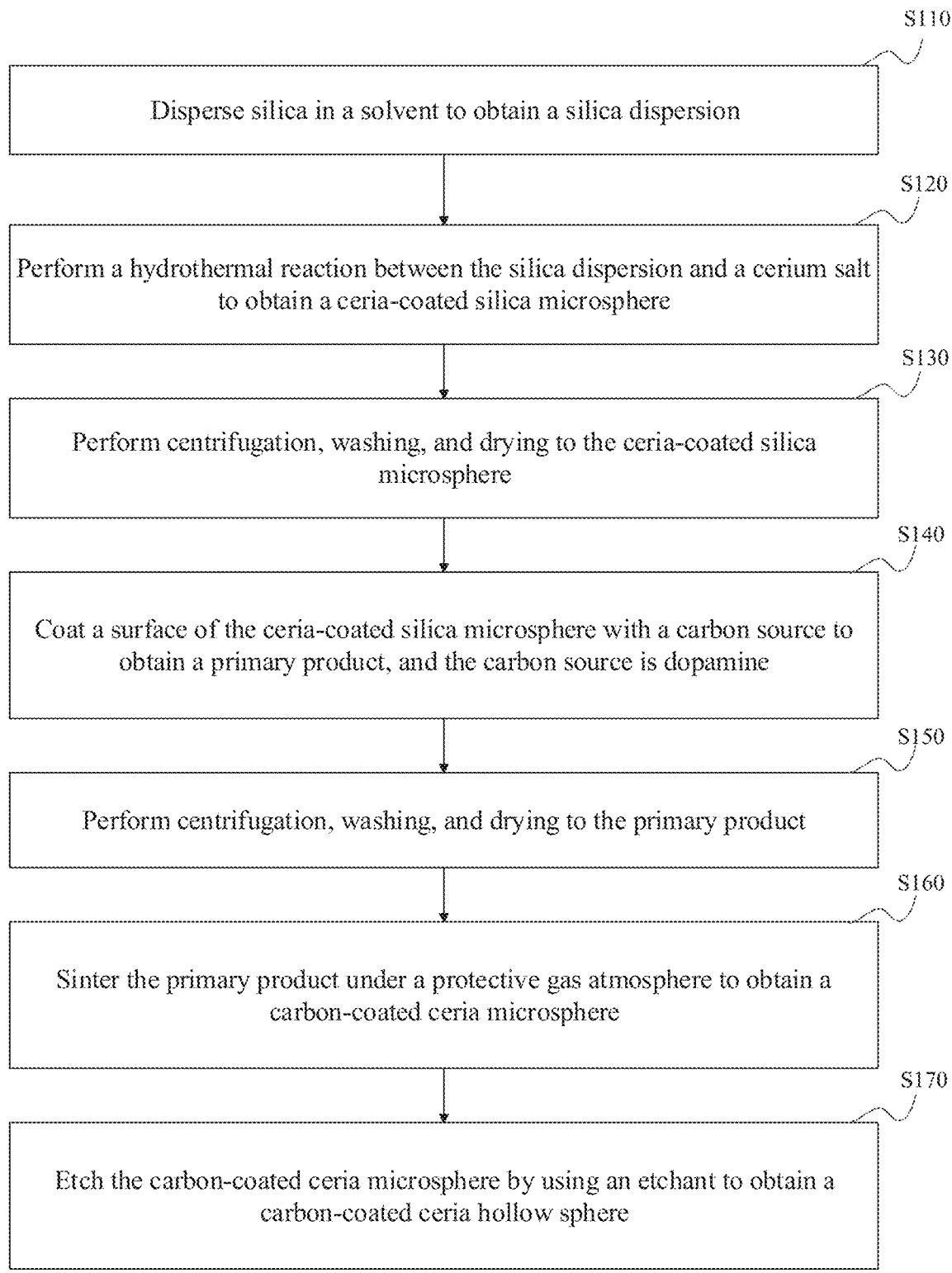
FIG. 1 is a flowchart of a method of preparing a carbon-coated ceria hollow sphere according to an embodiment.

Referring to FIG. 1, a method of preparing a carbon-coated ceria hollow sphere according to an embodiment includes the following steps of:

In step S110, silica is dispersed in a solvent to obtain a silica dispersion.

In one embodiment, the silica has an average particle size in a range from 200 nm to 500 nm. The solvent is at least one selected from the group consisting of water, ethylene glycol, ethanol, and isopropanol. An amount ratio of the silica, to the solvent ranges from 1 mg/mL to 20 mg/mL. The silica is dispersed in the solvent by stirring or ultrasonic dispersion.

In step S120, the silica dispersion is hydrothermally reacted with a cerium salt to obtain a ceria-coated silica microsphere.

In one embodiment, the cerium salt is at least one selected from the group consisting of cerium nitrate, cerium acetylacetonate, cerium carbonate, cerium oxalate, and cerium sulfate. The cerium salt is added to the silica dispersion in a form of an aqueous cerium salt solution. The cerium salt has a molar concentration of 1 mol/L to 3 mol/L. In addition, a mass ratio of the silica to the cerium element in the cerium salt is from 1:0.3 to 1:3.

The cerium salt and the silica dispersion are uniformly mixed and then transferred to a polytetrafluoroethylene-lined stainless steel autoclave for hydrothermal reaction. The hydrothermal reaction is performed at a temperature of 100° C. to 180° C., and the hydrothermal reaction is performed for a time of 5 h to 20 h. Preferably, the hydrothermal reaction is performed at a temperature of 110° C. to 160° C.

During the step of preparing the ceria-coated silica microsphere, the hydrothermal reaction is performed at a relatively low temperature, which is advantageous for improving the safety of the reaction and reducing the production cost. In addition, the temperature is controlled at 100° C. to 180° C., or can also be controlled at 110° C. to 160° C., so that more oxygen-containing groups can be retained on the surface of silica, which is beneficial to the formation of Si—O—Ce chemical bonds on the surface of the silica.

In step S130, the ceria-coated silica microsphere is subjected to centrifugation, washing, and drying.

The ceria-coated silica microsphere is washed alternately with water and ethanol. The number of times of water washing and ethanol washing is 1 to 5 times. The ceria-coated silica microsphere is washed, centrifuged, and then vacuum dried under a temperature of 50° C. to 80° C.

In step S140, the ceria-coated silica microsphere is coated with a carbon source to obtain a primary product.

In one embodiment, the carbon source is at least one selected from glucose, fructose, sucrose, and dopamine.

When the carbon source is at least one selected from glucose, fructose, and sucrose, the step of coating the ceria-coated silica microsphere with the carbon source to obtain the primary product is as follows: the ceria-coated silica, microsphere is added to an aqueous solution of the carbon source and uniformly mixed, and then transferred to a hydrothermal reactor for hydrothermal reaction. The hydrothermal reaction is performed at a temperature of 160° C. to 190° C., and the hydrothermal reaction is performed for a time of 2 h to 8 h. A mass ratio of the carbon source to the ceria-coated silica microsphere ranges from 1:1 to 20:1. The aqueous solution of the carbon source has a mass concentration of 1% by weight to 20% by weight.

When the carbon source is dopamine, the step of coating the ceria-coated silica microsphere with the carbon source to obtain the primary product is as follows: the ceria-coated silica microsphere is added into a trihydroxymethyl aminomethane buffer solution with a pH of 7.4 to 9.0 and uniformly mixed, and then the dopamine is added and mixed for 1 h to 24 h to obtain the primary product. A mass ratio of the ceria-coated silica microsphere to the dopamine ranges from 4:1 to 1:3. An amount ratio of the ceria-coated silica microsphere to the trihydroxymethyl aminomethane buffer solution ranges from 0.5 mg/mL to 20 mg/mL. The mixing treatment is performed by stirring, and the rotating speed of the stirring is from 120 rad/min to 300 rad/min. The aforementioned step of coating with dopamine as the carbon source is performed at 15° C. to 35° C.

In step S150, the primary product is subjected to centrifugation, washing, and drying.

The primary product is washed alternately with water and ethanol. The number of times of water washing and ethanol washing is from 1 to 5 times. The primary product after alternately washing with water and ethanol is centrifuged, and then the obtained solid is vacuum dried under the temperature of 50° C. to 80° C.

In step S160, the primary product is sintered under a protective gas atmosphere to obtain a carbon-coated ceria microsphere.

The protective gas is at least one selected from the group consisting of argon gas and nitrogen gas. When the sintering is performed, the temperature is heated to 500° C. to 900° C., and the temperature is kept for 2 h to 10 h. The sintering treatment is performed in a tube furnace, and the heating rate ranges from 1° C./min to 5° C./min.

In step S170, the carbon-coated ceria microsphere is etched by using an etchant to obtain a carbon-coated ceria hollow sphere.

The etchant is at least one selected from the group consisting of sodium hydroxide and hydrofluoric acid. The etchant is an aqueous solution of sodium hydroxide or hydrofluoric acid. In addition, a molar concentration of sodium hydroxide is from 2 mol/L to 5 mol/L, a mass concentration of hydrofluoric acid is from 5% to 10%.

The carbon-coated ceria microsphere is immersed in the etchant for 24 h to 72 h to remove the silica to obtain the carbon-coated ceria hollow sphere.

In the aforementioned method of preparing the carbon-coated ceria hollow sphere, the ceria-coated silica microsphere is prepared firstly by using silica as a template, and the carbon layer is coated on the ceria-coated silica microsphere and sintered, and then the silica is removed by using the etchant to obtain the carbon-coated ceria hollow sphere. The hollow structure enables the carbon-coated ceria hollow sphere to have a high BET (Brunauer, Emmett, and Teller) surface area. In addition, the carbon layer is uniformly filled into the pores of the ceria grains and a thin film is formed on the surface of the ceria, and Ce—O—C chemical bonds are formed between the carbon layer and the ceria, which can inhibit the growth of the grains of the ceria during sintering treatment process, and prevent the collapse of the hollow ceria microsphere, so that the prepared carbon-coated ceria hollow sphere has better structural stability. Moreover, it also makes the ceria grain smaller (within 30 nm), which is beneficial to the increase of the BET surface area. Furthermore, the formed carbon layer is graphitized carbon and has high conductivity. When coated and chemically bonded with $CeO_2$, the conductivity of $CeO_2$ can be greatly improved, thereby improving the corresponding electrochemical performance.

It should be emphasized that, the coating of the ceria-coated silica microsphere with the dopamine as the carbon source only requires to be performed under a temperature of 15° C. to 35° C. The coating of dopamine on the ceria-coated silica microsphere can be achieved without hydrothermal reaction, which is beneficial for improving production safety and reducing production cost. In addition, the dopamine is a nitrogen-containing compound, and the coated carbon obtained by using dopamine as the carbon source is nitrogen-doped graphitized carbon, which can further improve the conductivity and electrochemical activity of the carbon-coated ceria hollow sphere of the final product.

Moreover, in the aforementioned method of preparing the carbon-coated ceria hollow sphere, the step of removing the silica template is performed after performing carbon coating and sintering to form the graphitized carbon layer, so that it is beneficial for the dispersion of the ceria-coated silica microsphere in a hydrophilic solvent, thereby forming a uniformly dispersed solution and facilitating the uniform coating of the carbon layer. Furthermore, the carbon layer is not simply mixed with the ceria-coated silica microsphere, the presence of the ceria-coated silica microsphere can facilitate the uniform filling of carbon in the pores of the ceria grains and formation of the carbon layer on the surface.

It should be noted that, the steps S130 and S150 in the aforementioned method of preparing the carbon-coated ceria hollow sphere can be omitted.

A carbon-coated ceria hollow sphere is prepared by the above preparation method.

The following is a description of specific examples, and the following examples, unless otherwise specified, do not contain other unspecified components other than unavoidable impurities.

Example 1

Figure 2:
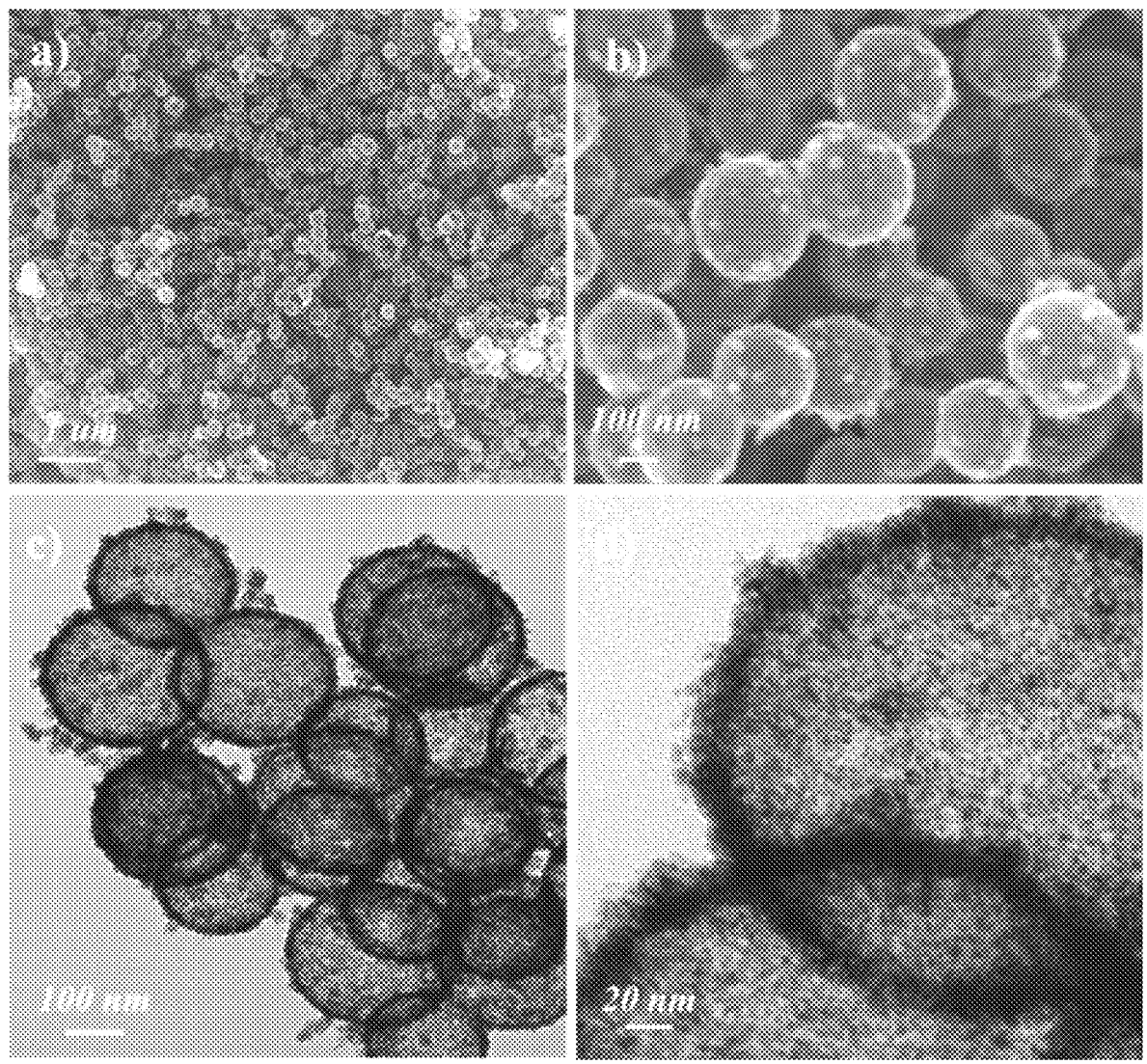
FIG. 2 shows scanning electron microscope images (a, b) and transmission electron microscope images (c, d) of a carbon-coated ceria hollow sphere prepared according to Example 1.
Figure 3:
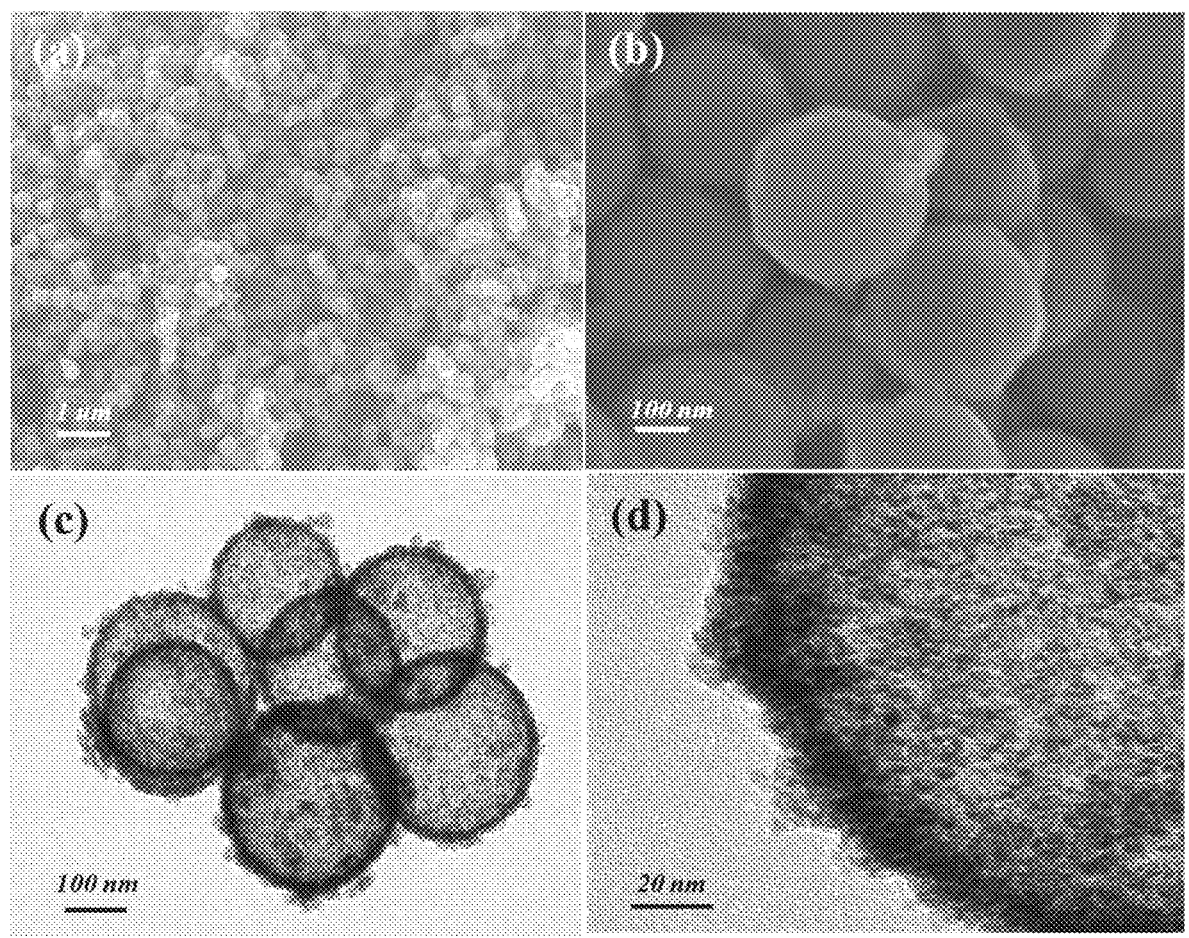
FIG. 3 shows scanning electron microscope images (a, b) and transmission electron microscope images (c, d) of a carbon-coated ceria hollow sphere prepared according to Example 5.

250 mg of silica with an average particle size of 200 nm was weighed and dispersed in 35 ml of ethylene glycol, and stirred until the silica was uniformly dispersed to obtain a silica dispersion. 2 mL of an aqueous solution of cerium nitrate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 130° C., and the reaction time was 15 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 50 mg of ceria-coated silica microspheres were added into 35 g of an aqueous solution of glucose with a mass concentration of 1 wt % and mixed uniformly, and then were transferred to a polytetrafluoroethylene-lined stainless steel autoclave for hydrothermal reaction to obtain a primary product. The temperature of the hydrothermal reaction was 180° C., and the time for the hydrothermal reaction was 3 h. After the autoclave was naturally cooled to room temperature, the reaction solution was vacuum filtered, washed alternately with water and ethanol, and then vacuum dried at 70° C. for 12 h to obtain the primary product. The primary product was placed in a tube furnace, heated to 800° C. at a heating rate of 2° C./min under an argon atmosphere, and then kept for 5 h. Then, carbon-coated ceria microspheres were obtained after naturally cooled to room temperature. The carbon-coated ceria microspheres were then immersed in a 5 mol/L of sodium hydroxide solution for 48 h to remove the silica to obtain carbon-coated ceria hollow spheres. The scanning electron microscope images of the carbon-coated ceria hollow sphere prepared according to Example 1 was shown in a) and b) in FIG. 2, and the transmission electron microscope images of the carbon-coated ceria hollow sphere was shown in c) and d) in FIG. 2.

Example 2

250 mg of silica with an average particle size of 500 nm was weighed and dispersed in 35 ml of water, and stirred until the silica was uniformly dispersed to obtain a silica dispersion. 1 mL of an aqueous solution of cerium carbonate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 110° C., and the reaction time was 20 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 350 mg of ceria-coated silica microspheres were added into 35 g of an aqueous solution of fructose with a mass concentration of 20 wt % and mixed uniformly, and then were transferred to a polytetrafluoroethylene-lined stainless steel autoclave for hydrothermal reaction to obtain a primary product. The temperature of the hydrothermal reaction was 160° C., and the time for the hydrothermal reaction was 3 h. After the autoclave was naturally cooled to room temperature, the reaction solution was vacuum filtered, washed alternately with water and ethanol, and then vacuum dried at 50° C. for 24 h to obtain the primary product. The primary product was placed in a tube furnace, heated to 900° C. at a heating rate of 2° C./min under an argon atmosphere, and then kept for 2 h. Then, carbon-coated ceria microspheres were Obtained after naturally cooled to room temperature. The carbon-coated ceria microspheres were then immersed in a 5 wt % of hydrofluoric acid solution for 48 h to remove the silica to obtain carbon-coated ceria hollow spheres.

Example 3

450 mg of silica with an average particle size of 300 nm was weighed and dispersed in 35 ml of ethanol, and stirred until the silica was uniformly dispersed to obtain a silica dispersion. 0.43 mL of an aqueous solution of cerium oxalate with a molar concentration of 3 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 180° C., and the reaction time was 5 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 175 mg of ceria-coated silica microspheres were added into 35 g of an aqueous solution of sucrose with a mass concentration of 5 wt % and mixed uniformly, and then were transferred to a polytetrafluoroethylene-lined stainless steel autoclave for hydrothermal reaction to obtain a primary product. The temperature of the hydrothermal reaction was 190° C., and the time for the hydrothermal reaction was 3 h. After the autoclave was naturally cooled to room temperature, the reaction solution was vacuum filtered, washed alternately with water and ethanol, and then vacuum dried at 80° C. for 6 h to obtain the primary product. The primary product was placed in a tube furnace, heated to 900° C. at a heating rate of 5° C./min under an argon atmosphere, and then kept for 2 h. Then, carbon-coated ceria microspheres were obtained after naturally cooled to room temperature. The carbon-coated ceria microspheres were then immersed in a 5 mol/L of sodium hydroxide solution for 48 h to remove the silica to obtain carbon-coated ceria hollow spheres.

Example 4

45 mg of silica with an average particle size of 400 nm was weighed and dispersed in 35 ml of isopropanol, and stirred until the silica was uniformly dispersed to obtain a silica dispersion. 0.32 mL of an aqueous solution of cerium sulfate with a molar concentration of 1.5 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 110° C., and the reaction time was 16 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 87.5 mg of ceria-coated silica microspheres were added into 35 g of an aqueous solution of glucose with a mass concentration of 1 wt % and mixed uniformly, and then were transferred to a polytetrafluoroethylene-lined stainless steel autoclave for hydrothermal reaction to obtain a primary product. The temperature of the hydrothermal reaction was 180° C., and the time for the hydrothermal reaction was 3 h. After the autoclave was naturally cooled to room temperature, the reaction solution was vacuum filtered, washed alternately with water and ethanol, and then vacuum dried at 60° C. for 18 h to obtain the primary product. The primary product was placed in a tube furnace, heated to 500° C. at a heating rate of 1° C./min under an argon atmosphere, and then kept for 10 h. Then, carbon-coated ceria microspheres were obtained after naturally cooled to room temperature. The carbon-coated ceria microspheres were then immersed in a 2 mol/L of sodium hydroxide solution for 72 h to remove the silica to obtain carbon-coated ceria hollow spheres.

Example 5

35 mg of silica with an average particle size of 200 nm was weighed and dispersed in 35 ml of ethylene glycol, and stirred until the silica was uniformly dispersed to obtain a silica dispersion. 0.56 mL of an aqueous solution of cerium acetylacetonate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 160° C., and the reaction time was 10 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 50 mg of ceria-coated silica microspheres were added into 100 mL of a trihydroxymethyl aminomethane buffer solution with a pH of 7.4 and uniformly mixed, and then 12.5 mg of dopamine was added thereto at 22° C. and magnetic stirred at a rotating speed of 120 rad/min for 20 h to obtain a primary product. The reaction solution was vacuum filtered, washed alternately with water and ethanol, and then vacuum dried at 70° C. for 12 h to obtain the primary product. The primary product was placed in a tube furnace, heated to 500° C. at a heating rate of 2° C./min under an argon atmosphere, and then kept for 5 h. Then, carbon-coated ceria microspheres were obtained after naturally cooled to room temperature. The carbon-coated ceria microspheres were then immersed in a 5 wt % of hydrofluoric acid solution for 48 h to remove the silica to obtain carbon-coated ceria hollow spheres.

Example 6

250 mg of silica with an average particle size of 500 nm was weighed and dispersed in 35 ml of ethylene glycol, and stirred until the silica was uniformly dispersed to obtain a silica dispersion. 1 mL of an aqueous solution of cerium oxalate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 130° C., and the reaction time was 15 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 10 mg of ceria-coated silica microspheres were added into 100 mL of a trihydroxymethyl aminomethane buffer solution with a pH of 8.5 and uniformly mixed, and then 30 mg of dopamine was added thereto at 35° C. and magnetic stirred at a rotating speed of 300 rad/min for 5 h to obtain a primary product. The reaction solution was vacuum filtered, washed alternately with water and ethanol, and then vacuum dried at 70° C. for 12 h to obtain the primary product. The primary product was placed in a tube furnace, heated to 600° C. at a heating rate of 2° C./min under an argon atmosphere, and then kept for 5 h. Then, carbon-coated ceria microspheres were obtained after naturally cooled to room temperature. The carbon-coated ceria microspheres were then immersed in a 5 mol/L of sodium hydroxide solution for 48 h to remove the silica to obtain carbon-coated ceria hollow spheres.

Example 7

35 mg of silica with an average particle size of 200 nm was weighed and dispersed in 35 ml of ethylene glycol, and stirred until the silica was uniformly dispersed to obtain a silica dispersion. 0.56 mL of an aqueous solution of cerium acetylacetonate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 150° C., and the reaction time was 12 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 50 mg of ceria-coated silica microspheres were added into 10 mL of a trihydroxymethyl aminomethane buffer solution with a pH of 9.0 and uniformly mixed, and then 50 mg of dopamine was added thereto at 25° C. and magnetic stirred at a rotating speed of 120 rad/min for 20 h to obtain a primary product. The reaction solution was vacuum filtered, washed alternately with water and ethanol, and then vacuum dried at 70° C. for 12 h to obtain the primary product. The primary product was placed in a tube furnace, heated to 500° C. at a heating rate of 2° C./min under an argon atmosphere, and then kept for 5 h. Then, carbon-coated ceria microspheres were obtained after naturally cooled to room temperature. The carbon-coated ceria microspheres were then immersed in a 5 wt % of hydrofluoric acid solution for 48 h to remove the silica to obtain carbon-coated ceria hollow spheres.

Example 8

250 mg of silica with an average particle size of 500 nm was weighed and dispersed in 35 ml of ethylene glycol, and stirred until the silica was uniformly dispersed to obtain a silica dispersion. 1 mL of an aqueous solution of cerium nitrate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 130° C., and the reaction time was 15 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 100 mg of ceria-coated silica microspheres were added into 100 mL of a trihydroxymethyl aminomethane buffer solution with a pH of 8.0 and uniformly mixed, and then 50 mg of dopamine was added thereto at 35° C. and magnetic stirred at a rotating speed of 300 rad/min for 5 h to obtain a primary product. The reaction solution was vacuum filtered, washed alternately with water and ethanol, and then vacuum dried at 70° C. for 12 h to obtain the primary product. The primary product was placed in a tube furnace, heated to 600° C. at a heating rate of 2° C./min under an argon atmosphere, and then kept for 5 h. Then, carbon-coated ceria microspheres were obtained after naturally cooled to room temperature. The carbon-coated ceria microspheres were then immersed in a 5 mol/L of sodium hydroxide solution for 48 h to remove the silica to obtain carbon-coated ceria hollow spheres.

Example 9

250 mg of silica with an average particle size of 200 nm was weighed and dispersed in 35 ml of ethylene glycol, and stirred until the silica was uniformly dispersed to obtain a silica dispersion. 2 mL of an aqueous solution of cerium nitrate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 130° C., and the reaction time was 15 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. The ceria-coated silica microspheres were then immersed in a 5 mol/L of sodium hydroxide solution for 48 h to remove the silica to obtain hollow ceria spheres. 50 mg of ceria hollow spheres were added into 35 g of an aqueous solution of glucose with a mass concentration of 1 wt % and mixed uniformly, and then were transferred to a polytetrafluoroethylene-lined stainless steel autoclave for hydrothermal reaction to obtain a primary product. The temperature of the hydrothermal reaction was 180° C., and the time for the hydrothermal reaction was 3 h. After the autoclave was naturally cooled to room temperature, the reaction solution was vacuum filtered, washed alternately with water and ethanol, and then vacuum dried at 70° C. for 12 h to obtain the primary product. The primary product was placed in a tube furnace, heated to 800° C. at a heating rate of 2° C./min under an argon atmosphere, and then kept for 5 h. Then, carbon-coated ceria hollow spheres were obtained after naturally cooled to room temperature.

Example 10

250 mg of silica with an average particle size of 200 nm was weighed and dispersed in 35 ml of ethylene glycol, and stirred until the silica was uniformly dispersed to obtain a silica dispersion. 2 mL of an aqueous solution of cerium nitrate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 130° C., and the reaction time was 15 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. The ceria-coated silica microspheres were placed in a muffle furnace, heated to 500° C. at a heating rate of 2° C./min under an air atmosphere, and then kept for 5 h, and then naturally cooled to room temperature. The ceria-coated silica microspheres were then immersed in a 5 mol/L of sodium hydroxide solution for 48 h to remove the silica to obtain hollow ceria spheres.

Example 11

250 mg of silica with an average particle size of 200 nm was weighed and dispersed in 35 ml of ethylene glycol, and stirred until the silica was uniformly dispersed to obtain a silica dispersion. 2 mL of an aqueous solution of cerium nitrate with a molar concentration of 1 mol/L was added to the silica dispersion, uniformly mixed by ultrasonic dispersion, and then transferred to a polytetrafluoroethylene-lined stainless steel autoclave to perform hydrothermal reaction to obtain ceria-coated silica microspheres. A temperature of the hydrothermal reaction was 130° C., and the reaction time was 15 h. After the autoclave was naturally cooled to room temperature, the reaction solution was centrifuged to obtain ceria-coated silica microspheres. In addition, the ceria-coated silica microspheres were alternately washed with water and ethanol, centrifuged and purified. The finally obtained ceria-coated silica microsphere solids were vacuum dried under a temperature of 70° C. for 12 h. 50 mg of ceria-coated silica microspheres were added into 35 g of an aqueous solution of glucose with a mass concentration of 1 wt % and mixed uniformly, and then were transferred to a polytetrafluoroethylene-lined stainless steel autoclave for hydrothermal reaction to obtain a primary product. The temperature of the hydrothermal reaction was 180° C., and the time for the hydrothermal reaction was 3 h. After the autoclave was naturally cooled to room temperature, the reaction solution was vacuum filtered, washed alternately with water and ethanol, and then vacuum dried at 70° C. for 12 h to obtain the primary product. The primary product was placed in a tube furnace, heated to 800° C. at a heating rate of 2° C./min under an argon atmosphere, and then kept for 5 h. Then, carbon-coated curia microspheres were obtained after naturally cooled to room temperature.

The products prepared according to the above Examples 1 to 11 were subjected to a BET surface area test using a specific surface area tester. In addition, the products were applied to a supercapacitor. The obtained products, carbon black, and polytetrafluoroethylene were thoroughly mixed in a mass ratio of 7:2:1, and anhydrous ethanol was added dropwise to form a paste, which was uniformly spread on foamed nickel and vacuum dried at 65° C. for 8 h to obtain an electrode. The electrode prepared above was used as a working electrode, the mercury/mercury oxide was used as a reference electrode, the platinum wire electrode was used as a counter electrode, and 6 mol/L of potassium hydroxide solution was used as the electrolyte to form a three-electrode system. The specific capacity, rate performance, and cycle stability were tested on a CHI660E electrochemical workstation. The results were shown in Table 1.

TABLE 1

|  | BET surface area ($m^2/g$) | Specific capacity at 1 A/g current (F/g) | Specific capacity at 6 A/g current (F/g) | Specific capacity retention rate after charging and discharging for 5000 times at 10 A/g current (%) |
| --- | --- | --- | --- | --- |
| Example 1 | 160 | 501 | 480 | 92.9 |
| Example 2 | 155 | 483 | 462 | 92.2 |
| Example 3 | 150 | 476 | 450 | 92.1 |
| Example 4 | 157 | 490 | 470 | 93.2 |
| Example 5 | 175 | 535 | 521 | 93.6 |
| Example 6 | 165 | 527 | 511 | 93.0 |

TABLE 1-continued

|  | BET surface area (m²/g) | Specific capacity at 1 A/g current (F/g) | Specific capacity at 6 A/g current (F/g) | Specific capacity retention rate after charging and discharging for 5000 times at 10 A/g current (%) |
|---|---|---|---|---|
| Example 7 | 170 | 530 | 515 | 93.5 |
| Example 8 | 168 | 525 | 514 | 93.3 |
| Example 9 | 130 | 420 | 378 | 87.5 |
| Example 10 | 105 | 143 | 113 | 90.5 |
| Example 11 | 50 | 115 | 96 | 88.5 |

The coated carbon obtained by using dopamine as the carbon source can be nitrogen-doped graphitized carbon. The preparation method thereof is simplified, and nitrogen-doped graphitized carbon can be produced, which can further improve the conductivity and electrochemical activity of the carbon-coated ceria hollow sphere of the final product.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled, in the art within the technical scope disclosed in the present invention shall all fall within the protection scope of the present invention. Therefore, the protection scope of the present invention shall be subject to the protection scope of the appended claims.

What is claimed is:

1. A method of preparing a carbon-coated ceria hollow sphere, comprising the following steps of:
    dispersing silica in a solvent to obtain a silica dispersion;
    performing a hydrothermal reaction between the silica dispersion and a cerium salt to obtain a ceria-coated silica microsphere;
    coating the ceria-coated silica microsphere with a carbon source to obtain a primary product, wherein the carbon source is dopamine;
    sintering the primary product under a protective gas atmosphere to obtain a carbon-coated ceria microsphere; and
    etching the carbon-coated ceria microsphere by using an etchant to obtain a carbon-coated ceria hollow sphere.

2. The preparation method of claim 1, wherein the step of coating the ceria-coated silica microsphere with the carbon source to obtain the primary product is specifically:
    adding the ceria-coated silica microsphere into a trihydroxymethyl aminomethane buffer solution with a pH of 7.4 to 9.0; and
    adding dopamine under a temperature of 15° C. to 35° C. and mixing for 1 h to 24 h to obtain the primary product.

3. The preparation method of claim 2, wherein an amount ratio of the ceria-coated silica microsphere to the trihydroxymethyl aminomethane buffer solution ranges from 0.5 mg/mL to 20 mg/mL.

4. The preparation method of claim 1, wherein a mass ratio of the ceria-coated silica microsphere to the dopamine ranges from 4:1 to 1:3.

5. The preparation method of claim 1, wherein the solvent is at least one selected from the group consisting of water, ethylene glycol, ethanol, and isopropanol.

6. The preparation method of claim 1, wherein an amount ratio of the silica to the solvent ranges from 1 mg/mL to 20 mg/mL.

7. The preparation method of claim 1, wherein the cerium salt is at least one selected from the group consisting of cerium nitrate, cerium acetylacetonate, cerium carbonate, cerium oxalate, and cerium sulfate.

8. The preparation method of claim 1, wherein a mass ratio of the silica to cerium element in the cerium salt ranges from 1:0.3 to 1:3.

9. The preparation method of claim 1, wherein in the step of performing the hydrothermal reaction between the silica dispersion and the cerium salt to obtain the ceria-coated silica microsphere, a temperature of the hydrothermal reaction is 100° C. to 180° C., a time for the hydrothermal reaction is 5 h to 20 h.

10. The preparation method of claim 9, wherein the temperature of the hydrothermal reaction is 110° C. to 160° C.

11. The preparation method of claim 1, wherein during the step of sintering the primary product to obtain the carbon-coated ceria microsphere, a temperature during sintering is heated to a temperature of 500° C. to 900° C. and is kept for 2 h to 10 h.

12. The preparation method of claim 11, wherein a heating rate during sintering ranges from 1° C./min to 5° C./min.

13. The preparation method of claim 1, wherein the etchant is at least one selected from the group consisting of sodium hydroxide and hydrofluoric acid.

14. The preparation method of claim 13, wherein the etchant is an aqueous sodium hydroxide solution, a molar concentration of the aqueous sodium hydroxide solution is from 2 mol/L to 5 mol/L.

15. The preparation method of claim 13, wherein the etchant is an aqueous hydrofluoric acid solution, a mass concentration of the aqueous hydrofluoric acid solution is from 5% to 10%.

16. The preparation method of claim 1, wherein the step of etching is specifically: immersing the carbon-coated ceria microsphere in the etchant for 24 h to 72 h.

* * * * *